United States Patent [19]

Lucas

[11] B 3,985,828

[45] Oct. 12, 1976

[54] FLAME-RETARDED ACRYLIC MULTIPOLYMER-VINYL CHLORIDE POLYMER COMPOSITIONS

[75] Inventor: Howard Robert Lucas, Danbury, Conn.

[73] Assignee: American Cyanamid Company, Stamford, Conn.

[22] Filed: June 24, 1975

[21] Appl. No.: 589,966

[44] Published under the second Trial Voluntary Protest Program on February 17, 1976 as document No. B 589,966.

Related U.S. Application Data

[63] Continuation-in-part of Ser. No. 455,452, March 27, 1974, abandoned.

[52] U.S. Cl. ................ 260/876 R; 260/45.75 G; 260/45.75 P; 260/45.75 S; 260/23 XA

[51] Int. Cl.² ................ C08L 51/00; C08L 53/00

[58] Field of Search ............ 260/876 R, 45.75 G, 260/45.75 P, 45.75 S

[56] References Cited

UNITED STATES PATENTS

| | | | |
|---|---|---|---|
| 3,321,416 | 5/1967 | Rauschenbach et al. | 260/2.5 |
| 3,326,832 | 6/1967 | Rauschenbach et al. | 260/28.5 |
| 3,652,727 | 3/1972 | Yonezu et al. | 260/876 R |
| 3,657,390 | 4/1972 | Tanaka et al. | 260/876 R |
| 3,657,391 | 4/1972 | Curfman | 260/876 R |

*Primary Examiner*—Richard B. Turer
*Attorney, Agent, or Firm*—Frank M. Van Riet

[57] ABSTRACT

Acrylic multipolymer-vinyl chloride polymer compositions are rendered flame-retardant by the incorporation therein of dicyclopentadienyl iron or chromium acetyl acetonate.

6 Claims, No Drawings

FLAME-RETARDED ACRYLIC MULTIPOLYMER-VINYL CHLORIDE POLYMER COMPOSITIONS

CROSS-REFERENCE TO RELATED APPLICATIONS

This application is a continuation-in-part of my copending application, Ser. No. 455,452, filed Mar. 27, 1974, and now abandoned and entitled FIRE-RETARDANT ACRYLIC MULTIPOLYMER.

BACKGROUND OF THE INVENTION

U.S. Pat. No. 3,354,238, hereby incorporated herein by reference, discloses and claims a series of acrylic multipolymer compositions which generally constitute a majority of a methyl methacrylate-styrene-acrylonitrile terpolymer and a minor amount of polybutadiene grafted with methyl methacrylate, styrene and acrylonitrile.

While these acrylic multipolymers have proven to be exceptionally attractive in the molding industry for the preparation of thin-walled containers, etc., in some instances the multipolymers do not have a sufficiently high impact strength and moisture vapor transmission to enable them to be used in applications where exceptional impact resistance and resistance to vapor permeation is a necessity rather than just another property. These deficiencies have been overcome by blending specific amounts of vinyl chloride polymers with these multipolymers. While these new compositions function excellently in many applications, it has also been a prime concern of manufacturers to produce a composition which is also flame-retardant while remaining transparent and if such a system could be devised, a long felt need would be satisfied.

SUMMARY

I have now discovered that acrylic multipolymervinyl chloride polymer compositions can be modified to such an extent that their fire-resistance is materially enhanced, their transparency is retained and the majority of their remaining properties are substantially unaffected. I achieve this result by blending the acrylic multipolymer-vinyl chloride polymer compositions with dicyclopentadienyl iron or chromium acetyl acetonate to produce compositions which are not only of high impact strength and low vapor permeability but also are fire-resistance, and transparent.

DESCRIPTION OF THE INVENTION INCLUDING PREFERRED EMBODIMENTS

As mentioned briefly above, the novel compositions of the present invention comprise (1) from about 40 percent to about 95 percent, by weight, of a polymeric material comprising (a) from about 70 to about 95 percent, by weight, of a terpolymer of 65–75 parts of methyl methacrylate, 15–25 parts of styrene and 1–15 parts of acrylonitrile and (b) from about 5 to about 30 percent, by weight, of polybutadiene grafted with 65–80 parts of methyl methacrylate, 15–25 parts of styrene and 1–15 parts of acrylonitrile, (2) from about 5 to about 60 percent of a thermoplastic, non-cross-linked polyvinyl chloride, (3) a stabilizing amount of a compound which aids in the prevention of the decomposition of the vinyl chloride polymer, and (4) from about 0.25 to about 5.0 percent, by weight, of dicyclopentadienyl iron or chromium acetyl acetonate.

The percentages by weight of (a) and (b) are based on the total weight of (a) and (b) and the percentages by weight of (1), (2) and (4) are based on the total weight of (1) and (2) while the percentage by weight of (3) is based on the weight of (2).

Materials which can be used as component (1) of my novel compositions include those disclosed in the above-identified U.S. Patent and they can be prepared as disclosed therein. These acrylic multipolymers are preferably employed in a range of 50 to about 80 percent, by weight, of the instant composition, same basis.

Component (2) of the instant invention is a thermoplastic, non-cross-linked vinyl chloride polymer. This component is preferably employed in amounts ranging from about 20 to about 50 percent, by weight, same basis. Polyvinyl chloride is the preferred vinyl chloride polymer. It is a well known material and any method known in the art for its manufacture may be used to prepare it for use herein. Copolymers of 90–97 percent of vinyl chloride and 3–10 percent, by weight, of vinylidene chloride and copolymers of 85–95 percent of vinyl chloride and 5–15 percent, by weight, of vinyl acetate may also be used. I have found, however, that the molecular weight of the vinyl chloride polymer is critical and the polymer should therefore have an inherent viscosity, as measured by ASTM-D-1243-60-Method A, of at least about 0.50 in order to be effective in imparting increased impact strength to the system.

By the term "vinyl chloride polymer," as used herein, is meant homopolymeric vinyl chloride and copolymers of vinyl chloride with vinylidene chloride or vinyl acetate, or other monomers copolymerizable with vinyl chloride, with or without vinylidene chloride or vinyl acetate, to result in thermoplastic, non-cross-linked polymers, the properties of which, are not materially different from those of the homopolymer or expressly recited copolymers.

By the term "transparent" is meant that the composition transmits at least 80 percent of the light projected thereon in a manner as set forth in ASTM test D-1003 using a 1/16 inch thick specimen.

The third component of the novel compositions of the present invention is a stabilizing amount of a compound or mixture of compounds which will stabilize the vinyl chloride polymer and prevent it from degrading under the conditions of manufacture of the composition per se and the conditions under which the compositions are to be subjected by the ultimate consumer. I have found that amounts ranging from about 1.0 to about 5.0 percent, by weight, basis as above, provide this protection to component (2).

Examples of suitable stabilizers which may be employed as component (3) of my novel compositions include those having the formula

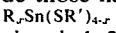

wherein x is 1–3, inclusive, R is alkyl, aralky, alkaryl or aryl, R' is the same as R or may include a carboxylic acid residue i.e. R²COOH or a carboxylic acid ester residue i.e. R²COOR³ wherein R² and R³ may be the same as R, R², however being bivalent due to the removal therefrom of one hydrogen atom. Additionally, when R' is a residue of a carboxylic acid, it may cyclicize because of the presence of the proper number (5–8) of atoms which can cyclicize. Examples of compounds falling within this formula include dibutyltin-β-mercapto propionate,
dibutyltin bis-w-carboxylauryl mercaptide, butyltin tris(isooctyl) mercaptoacetate,
tributyltin lauryl mercaptide,
dibutyltin bislauryl mercaptide,
dibutyltin bisoctyl mercaptide,
dibutyltin bisbenzyl mercaptide,
dibutyltin bisxylyl mercaptide,
dibutyltin biscyclohexyl mercaptide,
dibutyltin bisphenyl mercaptide,
dioctyltin bislauryl mercaptide,
dioctyltin bisoctyl mercaptide,
dioctyltin bisbenzyl mercaptide,
dioctyltin bisxylyl mercaptide,
dioctyltin biscyclohexyl mercaptide,
dicyclohexyltin bislauryl mercaptide,
dimethyltin bislauryl mercaptide,
dimethyltin bisbenzyl mercaptide,
dimethyltin biscyclohexyl mercaptide,
dimethyltin xylylbis mercaptide,
dibutyltin bis-w-carboxylauryl mercaptide,
dibutyltin $\beta$-mercapto propionate,
dioctyltin $\beta$-mercapto propionate,
dibutyltin bis isooctyl mercaptoacetate,
dioctyltin bis isooctyl mercaptoacetate,
dicyclohexyltin bis isooctyl mercaptoacetate,
dimethyltin bis isooctyl mercaptoacetate,
diphenyltin bis isooctyl mercaptoacetate,
dibutyltin bis lauryl mercaptoacetate,
dibutyltin bis benzyl mercaptoacetate,
dibutyltin bis cyclohexyl mercaptoacetate, and the like.

I can also utilize such stabilizers as the thioglycolates including dimethyltin bisoctyl thioglycolate; dioctyltin isooctyl thioglycolate etc. and the known barium-cadmium complexes including those containing zinc and the like, see U.S. Pat. No. 3,424,717, hereby incorporated herein by reference.

The fourth component of my novel compositions is dicyclopentadienyl iron or chromium acetyl acetonate. This material should preferably be used in flame-retarding amounts, those ranging from about 0.25 to about 3.0 percent, same basis, being exemplary.

The compositions disclosed herein can be prepared by blending the individual components together on, for example, a mill or by extruding the components after having crudely intermixed them together. When they are prepared by milling, component (1) is preferably placed on a mill, such as a two roll rubber mill, at about 250°–450°F., preferably 300°–400°F., and milled until a homogeneous melt is obtained. A composite of components (2), (3) and (4) is then added, in conjunction with any other ingredients which for any particular purpose may be required or desired, such as dyes, pigments, fillers, U.V. absorbers, plasticizers, etc., and the components are allowed to mill for from about 2–10 minutes.

If the novel compositions are to be prepared by extrusion, components (2), (3) and (4) are preferably preblended, along with other desired or necessary ingredients, at room temperature in a suitable mixer such as a Hobart mixer. The premixed components and component (1) are then subjected to mixing in a suitable mixing device such as a twin cone blender. The final blend is then extruded in a single or twin screw extruder, for example, at a temperature of 300°–450°F., preferably 350°–400°F.

Any other known method of blending components of the type employed herein such as ball milling, emulsion blending, etc., can, of course, be used without detracting from the scope of the instant invention.

My compositions may be utilized in any molding operation such as blow molding, injection and compression molding, vacuum forming etc. to form e.g. such articles as those used for the storage and transportation of commercial, industrial and household products. They may be used to form automobiles battery cases, tote boxes and the like, however, products which are subject to conditions of high temperature or which are continually utilized in situations where they may be in danger of being destroyed or contacted by fire and wherein transparency is preferred are those which may primarily be produced from my novel compositions.

The following examples are set forth for purposes of illustration only and are not to be construed as limitations on the present invention except as set forth in the appended claims. All parts and percentages are by weight unless otherwise specified. (In all the Examples, C = comparative).

EXAMPLE 1

30 Parts of an acrylic multipolymer composed of 87 percent of a terpolymer of methyl methacrylate, styrene and acrylonitrile (69/20/11) and 13 percent of polybutadiene grafted with methyl methacrylate, styrene and acrylonitrile (78/19/3) at a rubber to monomer ratio of 3/1 are milled on a two roll rubber mill at 350°F. until a homogeneous melt is obtained. A blend of 30.0 parts of polyvinyl chloride having an inherent viscosity of 1.11, as calculated via ASTM-D-1243-60; Method A, 1.2 parts of dimethyltin bisoctyl thioglycolate and 1.2 parts of dicyclopentadienyl iron is added and allowed to mill for 5 minutes. The resultant composition is pressed between the two plates of a molding press at 350°F. for 5 minutes and then cooled to room temperature under pressure. A 1/16 inch sheet having a light transmission of 81 percent (ASTM-D-1003) and an Oxygen Index of 32.8 is recovered. A similar sheet containing no iron compound has an Oxygen Index of 24.0. The Oxygen Index of the compositions is a measure of the flame-retardancy of the system. A specimen having an Oxygen Index of about 24.0 when held vertically and ignited from the bottom will consume itself, whereas a sample having an Oxygen Index of about 27.0 or greater will not.

EXAMPLE 2

The procedure of Example 1 is again followed except that 70 parts of the grafted rubber-resin composition and 30 parts of the polyvinyl chloride are employed, all else remaining equal. A system having an Oxygen Index of 21.2 or below will burn when ignited as above while an Oxygen Index of about 23.5 or higher will not. A sheet having a light transmission of 82 percent and an Oxygen Index of 28.9 is recovered. A sheet void of the iron compound has an Oxygen Index of 21.2.

EXAMPLE 3

The procedure of Example 2 is again followed except that the dicyclopentadienyl iron is replaced by equivalent amount of chromium acetyl acetonate. The resultant sheet has an Oxygen Index of 30.3 and a transparency of 82 percent.

EXAMPLE 4

When the procedure of Example 1 is again followed but the amount of grafted polybutadiene-terpolymer system used is 40 parts and the amount of polyvinyl chloride used is 60 parts, the resultant sheet has a light transmission value of 80 percent and an Oxygen Index of 29.8.

EXAMPLES 5–16

Following the procedure of Example 1, a series of compositions are prepared according to the present invention except that the percentages of polyvinyl chloride (PVC) and the organometallic compounds employed are varied. The following table shows the Oxygen Index (O.I.) increases achieved.

TABLE III

| Example | %PVC in Blend | %Cyclopenta-dienyl iron | %Chromium Acetyl Acetonate | O.I. |
|---|---|---|---|---|
| 5C | 30* | 0 | 0 | 21.5 |
| 6 | 30* | 1 | 0 | 27.9 |
| 7 | 30* | 0 | 1 | 28.1 |
| 8C | 40** | 0 | 0 | 23.2 |
| 9 | 40** | 0 | 1 | 30.1 |
| 10 | 40** | 0 | 2 | 32.7 |
| 11 | 40** | 1 | 0 | 29.9 |
| 12 | 40** | 2 | 0 | 32.3 |
| 13C | 50 | 0 | 0 | 24.0 |
| 14 | 50 | 0.25 | 0 | 30.0 |
| 15 | 50 | 0.5 | 0 | 30.8 |
| 16 | 50 | 1.0 | 0 | 31.2 |

\* = PVC has Inherent Viscosity, measured as set forth above, of 0.92.
\*\* = PVC has Inherent Viscosity, measured as set forth above, of 0.77.

EXAMPLES 17–20

When the stabilizer of Example 1 is replaced by (17) a commercially available organo tin mercaptan, (18) dibutyltin bis isooctyl mercaptoacetate, (19) tributyltin lauryl mercaptide, and (20) a barium-cadmium complex, the results achieved with regard to the flame-retardance and light transmission of the ultimate compositions are substantially the same.

EXAMPLE 21

The procedure of Example 1 is again followed except that the inherent viscosity of the polyvinyl chloride is 0.50, determined as set forth above, and the acrylic multipolymer is a blend of 90 percent of a 67/22/11 methyl methacrylate/styrene/acrylonitrile terpolymer and 10 percent of polybutadiene grafted with 68/21/11 methyl methacrylate/styrene/acrylonitrile in a rubber to monomer ratio of 3/1. Again a highly flame-retardant composition results. A 1/16 inch sheet formed from the composition has a light transmission of 84 percent.

EXAMPLE 22

When the procedure of Example 1 is again followed except that the acrylic multipolymer is a blend of 84 percent of a terpolymer of methyl methacrylate, styrene and acrylonitrile (72/22/6) and 16 percent of polybutadiene grafted with methyl methacrylate, styrene and acrylonitrile (80/17/3) at a 2.5/1 rubber to monomer ratio, an excellent flame-retarded composition is recovered. A sheet 1/16 inch in thickness, exhibits a light transmission of 83 percent.

EXAMPLE 23

Replacement of the polyvinyl chloride of Example 1 with a copolymer of vinyl chloride and vinyl acetate (95/5) again results in a highly effective, flame-retarded composition which, when formed into a 1/16 inch sheet, has a light transmission of 82 percent.

EXAMPLE 24

The copolymer of Example 23 is replaced with a vinyl chloride-vinylidene chloride copolymer (90/10) with equally effective results.

I claim:

1. A composition of matter comprising (1) a mixture of from about 40 to about 95 percent, by weight, of a polymeric material comprising (a) from about 70 to about 95 percent, by weight, of a terpolymer of 65–75 parts of methyl methacrylate, 15–25 parts of styrene and 1–15 parts of acrylonitrile and (b) from about 5 to about 30 percent, by weight, of polybutadiene grafted with 65–80 parts of methyl methacrylate, 15–25 parts of styrene and 1–15 parts of acrylonitrile, (2) from about 5 to about 60 percent, by weight, of a thermoplastic, non-cross-linked vinyl chloride polymer and (3) a stabilizing amount of an additive comprising (A) a compound having the formula

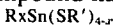

wherein x is 1–3, inclusive, R is alkyl, aralkyl, alkaryl, or aryl, R' is the same as R or may include a carboxylic acid residue or a carboxylic acid ester residue, or (B) a barium-cadmium complex, containing (4) from about 0.025 to about 5.0 percent, by weight, based on the total weight of said composition, of dicyclopentadienyl iron or chromium acetyl acetonate.

2. A composition of matter according to claim 1 wherein (2) has an inherent viscosity of at least about 0.50.

3. A composition of matter according to claim 1 wherein said vinyl chloride polymer is polyvinyl chloride.

4. A composition of matter according to claim 1 wherein said vinyl chloride polymer is a copolymer of vinyl chloride and vinylidene chloride.

5. A composition of matter according to claim 1 wherein (4) is dicyclopentadienyl iron.

6. A composition of matter according to claim 1 wherein (4) is chromium acetyl acetonate.

* * * * *